2,444,578

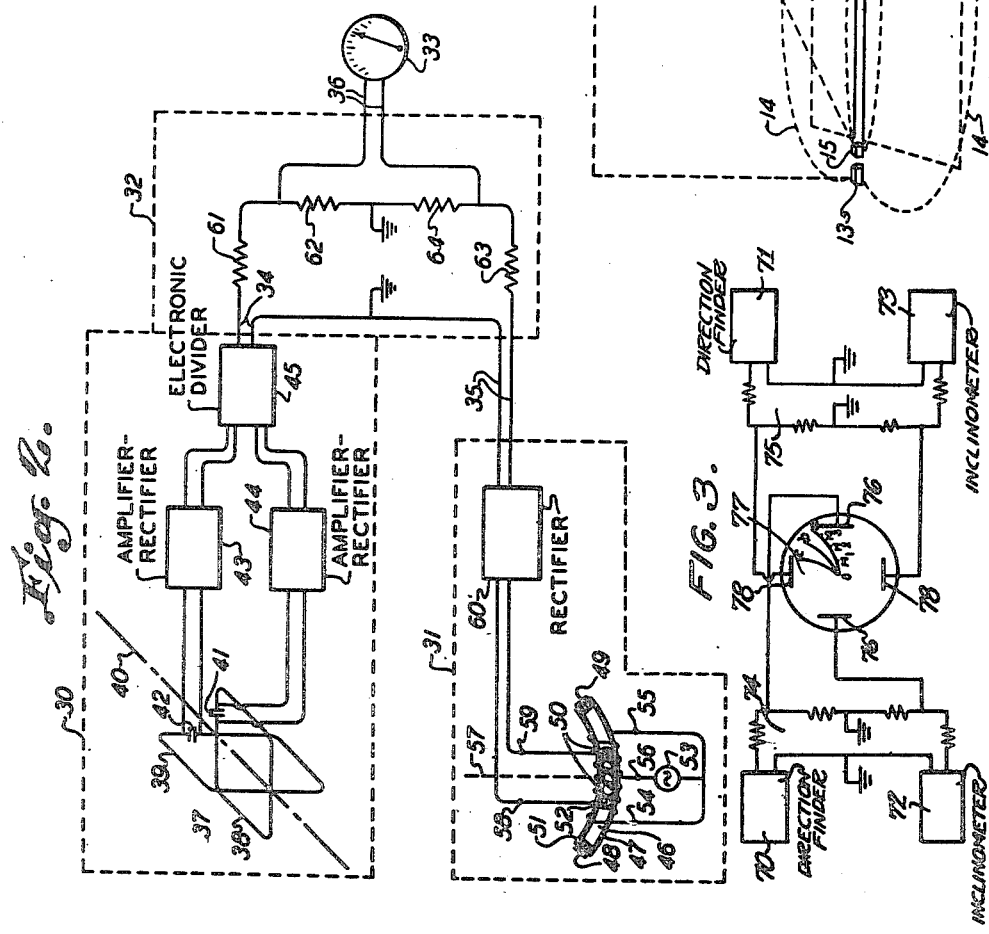
July 6, 1948.  J. NEUFELD  2,444,578
NAVIGATIONAL METHOD AND APPARATUS
Filed June 16, 1942
INVENTOR
Jacob Neufeld Patented July 6, 1948

UNITED STATES PATENT OFFICE 2,444,578

NAVIGATIONAL METHOD AND APPARATUS

Jacob Neufeld, Tulsa, Okla.

Application June 16, 1942, Serial No. 447,243

14 Claims. (Cl. 343—112)

1

My invention relates to a radio signalling system and deals with an improved arrangement for determining the position of an aircraft in space. More specifically it is directed to a system whereby under conditions of poor or of no visibility, the pilot of an aircraft, through the instrumentality of an automatically operated signal responsive apparatus aboard the aircraft, will be informed regarding the position of the aircraft with reference to various transmitting stations located adjacent to and within the boundaries of a landing field.

One object of this invention is to provide an improved aeronautical guide system and apparatus whereby the pilot of an aircraft, regardless of visibility conditions may make a safe and accurate landing.

The problem of blind landing of an aircraft comprises two part-problems, viz., the fixing and the maintenance of a suitable horizontal and vertical landing direction. The first part-problem, i. e., the fixing and the maintenance of the horizontal landing direction presents relatively small difficulties and has already been solved in various ways.

The invention relates to the solution of the second part-problem, the so-called vertical navigation. It is well known in the art to place for the above purposes surfaces of constant intensity in the landing space with the aid of a short-wave transmitter and to use one of these surfaces as a gliding path for the airplane, the latter being so controlled when landing that it follows an intensity value corresponding to the gliding path in question. However, it is not possible to obtain with the curvature of such a gliding path the proper vertical landing curve.

The object of my invention is to provide a method and a system for vertical navigation, by means of which the vertical position of the aircraft can be automatically determined at any desired instance and the gliding path of the aircraft can be controlled in any desired manner.

This can be accomplished according to my invention by locating on the airport a transmitter radiating horizontally polarized waves and utilizing on the aircraft a directional receiving system combined with a means for continuously and automatically indicating the angle of elevation of the aircraft.

My present method of direction finding differs from the ones of the prior art in the use of horizontally polarized waves instead of vertically polarized waves. In the prior art the direction finding methods depended on the radio reception of

2 vertically polarized waves and on directional properties of aerials rotatable around a vertical axis. The position of the craft has been determined by means of direction finders which in virtue of the properties of a certain type of aerial systems makes it possible to find the horizontal angle of incidence of received signals relative to some standard, which in some instances was taken as the fore-and-aft direction of the plane, and in other instances as the direction of true North. One of the methods of direction finding in a horizontal plane has been described in my U. S. Patent No. 2,190,038 describing an arrangement utilizing two closed loop aerials, arranged with their planes vertical at right angles to each other. In the present method I use a directional aerial including two loops intersecting one another along a horizontal axis. The aerial is adapted to respond to the vertical angle of incidence of the waves, and to produce a signal indicating the angle of elevation of the aircraft with respect to the ground transmitting station, transmitting the horizontally polarized waves. I may also provide at known geographical positions on the ground two or more stations transmitting horizontally polarized waves of various frequencies. By tuning his receiver to these frequencies the pilot may find the angle of elevation of the aircraft with respect to each of these transmitting stations and thus to determine accurately his position and orientation with respect to the ground.

The objects of my invention will be apparent from the following detailed description and the accompanying drawings. It is to be expressly understood, however, that these drawings are for purposes of illustration only and art not designed for a definition of the limits of my invention. Referring to the illustrations;

Fig. 1 shows a perspective view of a landing field, and indicates the position of the craft with respect to the field.

Fig. 2 shows diagrammatically an instrument located in the craft and indicating the angle of elevation of the aircraft.

Fig. 3 shows an arrangement for combining indications of two instruments of the type shown in Fig. 2.

Referring now more particularly to Fig. 1, the numeral 10 designates an aircraft approaching the landing field 11. The aircraft is directed along a vertical plane 12 by means of a runway localizing beacon 13, which transmits double modulation signals. The spacial pattern of these signals has been designated by 14. The method of guiding the aircraft in the horizontal direction by means of double modulation signals is well known in the art and its description can be found in Bureau of Standards Research Paper RP602, on Performance tests of radio system of landing aids, by H. Diamond. Such a method in itself does not constitute the subject of the present invention, since the present invention refers specifically to a method of providing a vertical guidance in the vertical plane. Numerals 15 and 16 designate two radio transmitting stations located at determined points on the airport and radiating in space electromagnetic waves which are polarized horizontally in the direction perpendicular to the vertical plane 12. The arrows 17, 18 show the directions of the transmitting stations 15 and 16 as viewed from the aircraft. The arrow 19 coincides with the longitudinal axis of the craft and indicates the direction towards which the craft is heading. The arrow 20 indicates the horizontal direction in the plane 12.

Consider now the instrument shown in Fig. 2. In order to illustrate better its structural details and operation the instrument has been shown as consisting of three component parts included in the dotted rectangles 30, 31 and 32 respectively and of an indicator 33. The arrangement contained in the rectangle 30 shall be somtimes designated as direction finder. It contains a system responsive to the horizontally polarized waves received from the transmitting station 15 on the ground and delivering across the output terminals 34 a voltage the magnitude of which represents the angle $\alpha$ between the longitudinal axis of the craft indicated by the arrow 19 and the direction of the transmitting station indicated by the arrow 17. The rectangle 31 represents an inclinometer responsive to the angle $\beta$ between the direction of the longitudinal axis of the craft indicated by the arrow 19 with respect to the horizontal direction and giving across the output terminals 35 a voltage the magnitude of which represents the value $\beta$. The rectangle 32 includes an electrical circuit receiving from its input terminals 34 and 35 voltages representing the angles $\alpha$ and $\beta$ respectively and delivering across its output terminals 36 a voltage representing the algebraic sum of the input voltages, i. e., the value $\alpha+\beta$. The value $\alpha+\beta$ is being indicated by the meter 33 and represents the direction of the transmitting station with respect to the horizontal. In Fig. 1 the value $\alpha+\beta$ represents the angle between the directions of the arrows 17 and 20.

Referring now more particularly to the block 30, the numeral 37 represents a directional aerial comprising a horizontal antenna loop 38 and a vertical antenna loop 39. The loops 38 and 39 are fixedly mounted on the craft and are arranged in such a manner that the line 40 of intersection of the planes of the loops is perpendicular to the transversal axis of the craft.

The loops 38 and 39 are tuned by means of condensers 41 and 42 respectively and have their outputs connected to amplifier-rectifiers 43 and 44 respectively. The amplifier-rectifiers are connected to an electronic divider 45 which may be of the type described in my U. S. Patent No. 2,129,880.

In order to understand the operation of the arrangement contained in the rectangle 30, assume that the instantaneous position of the craft is such that the angle $\alpha$ between the longitudinal axis of the craft and the direction of the transmitting station 15 is 45°. Then the antennas 38 and 39 will absorb equal amounts of energy. The amplifier-rectifiers 43 and 44 will consequently deliver equal voltages to the electronic divider 45 and the output of the electronic divider will indicate across the terminals 34 the value of the ratio equal to one.

If, however, the craft changes its position so that the angle $\alpha$ increases, there is an increase in responsiveness in one of the antennas and a corresponding decrease in the other antenna. In that connection it is important to note that the ratio of responsiveness of the two antennas depends upon a given value $\alpha$ irrespective of the signal strength or distance from the station.

It is, therefore, apparent that the output of the arrangement 30 indicates the angle $\alpha$.

Referring now more particularly to the block 31, the numeral 46 shows an inclinometer of the gravity actuated ball type similar to the one described in the U. S. Patent 2,067,474, issued to V. E. Carbonara. It should be kept in mind, however, that the inclinometer described by Carbonara serves to indicate the lateral inclination or bank while the inclinometer designated by 46 serves to indicate the longitudinal inclination of the craft.

The longitudinal inclination of the aircraft has been designated in the Fig. 1 by an arrow 19 and the angle $\beta$ shown in this figure is the angle between the directions of the arrows 19 and 20. The device designated by 46 consists of an accurately curved glass tube 47 mounted in a vertical plane longitudinally on the aircraft (while the tube in the U. S. Patent No. 2,067,474 is mounted transversely of the aircraft). The tube is closed at both ends by means of the caps 48 and 49, respectively, of some suitably porous material having a porosity such that air can pass therethrough only very slowly as, for example, closely matted steel or glass wool, thereby providing a substantially capillary passage.

Within the glass tube are placed five balls 50 preferably of steel, in order to have sufficient weight to be actuated by gravity. The bore of the glass tube is made so uniform through its entire length that when the balls placed in the tube have substantially the same diameter as the bore of the tube, said balls form a piston fit with the tube of such a nature that no air can pass around the balls.

By using different porous materials for the caps 48 and 49, different degrees of damping action on the balls 50 may be obtained.

It is now apparent that upon an inclination of the transversal axis of the craft the balls are caused to roll by gravity towards one or the other end of the tube.

A winding 52 is provided around the glass tube 47 and an A. C. current source 53 is provided to supply current to the winding. The two end terminals 54 and 55 of the winding are connected to one of the terminals of the source 53 while the midpoint 56 of the winding 52 is connected to the other terminal of the source. Under such an arrangement the current flowing in the portion of the winding between the midpoint 56 and the terminal 54 produces a flux which is opposite to the magnetic flux produced by the current flowing between the midpoint 56 and the terminal 55. It is now apparent that when the longitudinal axis of the craft is horizontal the iron balls are symmetrically located with respect to a vertical axis 57 and the magnetic paths encountered by the said fluxes are equal one to another and the resultant effect becomes nil. If, however, the longitudinal axis of the aircraft is not horizontal the balls displace themselves and occupy a positon which is not any more symmetrical with respect to the vertical axis. The two referred to magnetic fluxes do not counterbalance each other and there is produced a resultant magnetic flux which induces an A. C. voltage across the terminals 58 and 59. The magnitude of the said voltage indicates the angle $\beta$. This voltage becomes subsequently rectified in the rectifier 60 and applied across the terminals 35.

The electrical circuit included in the block 32 is adapted to receive across its input terminals 34 and 35 voltages representing the angles $\alpha$ and $\beta$, respectively, and to produce across the output terminals 36 the voltage representing the angle $\alpha+\beta$. As shown in the figure, one of the input terminals 34 is connected to the ground directly and the other input terminal is connected to the ground through a resistor 61 and a resistor 62. In a similar manner one of the input terminals 35 is connected to the ground directly and the other input terminal is connected to the ground through a resistor 63 and resistor 64. The resistors possess the common ground terminal and have other two terminals connected to the voltmeter 33.

The values of the resistors 61 and 62 have been so selected that the voltage across the resistor 62 has been made to be substantially proportional to the voltage applied across the terminals 34 and representing the angle $\alpha$. In a similar manner the values of the resistors 63 and 64 have been so selected that the voltage across the resistor 64 has been made to be substantially proportional to the voltage applied across the terminals 35 and representing the angle $\beta$. The resistors 62 and 64 are mounted in series so as to add the voltages across their terminals and, consequently, the voltage across the terminals 36 and indicated by 33 represents the algebraic sum of the angular values $\alpha$ and $\beta$.

It is apparent that the value $\alpha+\beta$ represents the inclination with respect to a horizontal of a transmitting station to which the receiver located on the craft is tuned. It is, therefore, apparent that I have provided a method and apparatus for continuously indicating such an inclination.

Referring now more particularly to Fig. 3 there is shown an arrangement for combining the indications of two systems of the type shown in Fig. 2. Each of the said systems comprises a direction finder designated by block 70 or 71 and an inclinometer designated by block 72 or 73. The direction finders 70 and 71 are of the tpye described in connection with Fig. 2 and designated on Fig. 2 by a dotted rectangle 30. The inclinometers 72 and 73 are of the type described in connection with Fig. 2 and designated on Fig. 2 by a dotted rectangle 31. The outputs of 70 and 72 are added by means of a circuit 74 similar to the one designated in Fig. 2 by a dotted rectangle 32 and their combined output is applied across deflecting electrodes 76 of a cathode ray oscillograph 77. In a similar way the outputs of 71 and 73 are added by means of circuit 75 and the combined output is applied across the deflecting electrodes 78 of the cathode ray oscillograph 77. The cathode ray oscillograph including the two pairs of deflecting electrodes is of a standard construction. It is provided with a beam of electrons controllable by the deflecting electrodes and impinging upon a fluorescent screen, thus, producing a luminous spot.

In order to understand the operation of the device, assume that the direction finder 70 is tuned to the frequency of the waves transmitted by the station 15 and the direction finder 71 is tuned to the frequency of the waves transmitted by the station 16. The relative position of the station 15 and 16 is shown in Fig. 1. It is now apparent that the combined output of 70 and 72 applied across the deflecting electrodes 76 indicates the value $\alpha+\beta$. This value represents the angle between the directions 17 and 20 and, consequently, determines the angle of elevation of the aircraft 10 with respect to the transmitter 15. In a similar manner the combined output of the direction finder 71 and the inclinometer 73 across the deflecting electrodes 78 indicates the value $\alpha_1+\beta$. This value represents the angle between the directions 18 and 20 and, consequently, determines the angle of elevation of the aircraft 10 with respect to the transmitter 16. It is well known that the position of the aircraft 10 in the vertical plane 12 is determined by the two values of the angle of elevation with respect to the stations 15 and 16 respectively. On the other hand, however, the position of the luminous spot on the cathode ray screen depends upon the potentials of the deflecting electrodes and, consequently, this position determines also the location of the aircraft 10 in the vertical plane 12. During the landing operations the aircraft should occupy a certain succession of predetermined positions and, consequently, the luminous spot of the screen of the cathode ray oscillograph should follow a predetermined trajectory. It is, therefore, apparent that in order to enable perfect landing conditions I provide on the screen of the cathode ray oscillograph a visible and permanent trace showing the trajectory which the luminous spot should follow during landing.

Consider now Fig. 3 representing the screen of the cathode ray oscillograph 77 as shown in the drawing. The screen is provided with three permanent traces designated as $a$, $b$ and $c$, each of said traces representing a selected glide path which the craft may follow during landing. Assume that the position of the craft shown in Fig. 1 is represented on the screen of the cathode ray tube by the point $M_1$, and that it is desired to effect a landing operation. The position of the craft in the vertical plane 12 can be represented by means of two angular coordinates, one of said coordinates representing the elevation of the craft with respect to the transmitter 15 and having a value $\alpha+\beta$, and the other coordinate representing the elevation of the craft with respect to the transmitter 16 and having a value $\alpha_1+\beta$. The cathode ray spot is being deflected horizontally by means of the electrodes 76 to the amount $\alpha+\beta$ and is being deflected vertically by means of the electrode 78 to the amount $\alpha_1+\beta$. Consequently, the rectangular coordinates of the point with respect to the central point 0 represent the angular coordinates of the craft with respect to the transmitters 15 and 16, the vertical coordinate $M_1A$ representing the angular elevation of the craft with respect to the transmitter 16 and the horizontal coordinate OA representing the angular elevation of the craft with respect to the transmitter 15.

The landing of the plane upon the field 11 depends upon the surrounding terrain and local conditions and should be effected along a predetermined glide path having a gradually changing slope with respect to the runway of the landing field. Consequently, in order to effect a successful landing the craft should descend upon the airfield along a predetermined trajectory and consequently should occupy in succession a predetermined set of positions, such as the positions having the coordinates successively represented by the points M₁, M₂ and M₃ and shown on the cathode ray screen of Fig. 3. It is therefore apparent that the line a permanently impressed upon the screen of the cathode ray tube and passing through the points M₁, M₂, M₃ and the remaining points representing the successful positions of the craft during its descent represents the landing trajectory of the craft. Therefore, during the landing process the navigator should guide his craft in such a manner as to cause the indicating spot of the cathode ray tube to follow the line a.

As stated above, the cathode ray screen is also provided with other traces such as the ones designated as b and c in Fig. 3 which are permanently impressed upon the screen and represent other trajectories which the craft may follow during landing. Thus in a congested airport several landings may be effected simultaneously. The pilots of the respective crafts will be notified in advance which of the trajectories given on the oscillograph screen that they should take and each of the pilots will follow his own trajectory without running the danger of colliding with other crafts which may be landing at the same time.

The importance of such an arrangement to an effective and useful landing will be evident when it is considered that in periods of low visibility or no visibility and in making blind landings, the pilot of an aircraft which is landing with the aid of this system, must rely entirely upon instrument indications of the position of the aircraft with respect to the various paths of the landing system in bringing the plane to earth. These indications show the position of the plane with respect to the airport runway and the position of the plane with respect to the curved landing path, and in the proper landing of the plane, under the conditions referred to, the pilot must rely upon the proper shape and direction of the paths of the system.

I claim:

1. A navigation device including in combination, means for producing a signal representing the bearing of a fixed point on the ground with respect to the longitudinal axis of a craft, an inclinometer for producing a signal representing the angle between the longitudinal axis of the craft and the horizontal, and means responsive to said two signals for producing a resultant signal, the said resultant signal representing the bearing of the fixed point on the ground with respect to the horizontal.

2. In a navigational system for determining angle of inclination of a line joining the aircraft and a point on the ground, a transmitter located on the ground at the said point, an aircraft having a directional antenna for determining the angle between the said line and the longitudinal axis of the plane, an inclinometer for determining the angle between the longitudinal axis of the plane and a horizontal, and a means responsive to the outputs of the directional antenna and of the inclinometer for determining the said angle of inclination.

3. In a navigational system for guiding a mobile craft with respect to fixed surroundings, a wave transmitting station located in said surroundings, means on the said craft responsive to the waves derived from said station for producing a signal representing the relative bearing in a vertical plane of the said station with respect to a reference direction, the said reference direction being fixed with respect to the craft, means for producing another signal representing the inclination of the said reference direction with respect to a direction fixed in said surroundings, and means responsive to the said signals for producing a resultant signal representing the absolute bearing of the said ground station with respect to the direction fixed in said surroundings.

4. In a navigational system for guiding an aircraft with respect to a ground station as projected upon a vertical plane, the said station transmitting waves, means on the said aircraft responsive to said waves for producing a signal representing a directional component of the arrival of the said waves, the said directional component being measured with respect to the said vertical plane, means for producing another signal representing the position of the said aircraft in the said vertical plane, and means responsive to said two signals for producing a resultant signal representing the position of the said aircraft with respect to the ground station.

5. A radio navigation device located in a craft, for indicating the projection upon a vertical plane of the absolute bearing of a fixed point on the ground, the said vertical plane passing through the longitudinal axis of the craft, comprising means for producing a signal representing the projection upon the vertical plane of the relative bearing of the said point with reference to the longitudinal axis of the craft, means for producing a signal representing the inclination of the longitudinal axis in the said vertical plane, and means responsive to the said signals in order for producing an indication representing the projection upon the said plane of the absolute bearing of the said fixed point.

6. A radio navigation device located in a craft, for indicating in a vertical plane the position of the craft with reference to two ground stations, the said stations being spaced one from the other, comprising means responsive to the waves transmitted by said stations for producing signals representing the projections upon the said plane of the bearings of the said stations, and means responsive to the said signals for producing the indication of the position of the said craft in the said plane.

7. A radio navigation device located in a craft, for indicating in a vertical plane the position of the craft with reference to two ground stations, the said stations transmitting electromagnetic waves at different frequencies, means selectively responsive to the said frequencies for producing signals representing the projections upon the said plane of the directions of the said stations, a cathode ray oscillograph, comprising a source of an electron stream impinging upon a screen, and means for deflecting the said electron stream by amounts related to the said signals for producing on the said screen an indication of the position of the said craft in the said vertical plane.

8. A navigational method for guiding an aircraft with respect to a ground station comprising the step of producing a signal repesenting the relative bearing in a vertical plane of the said ground station with respect to a reference direction, the said reference direction being fixed with respect to said aircraft, the step of producing another signal representing the inclination of the said reference direction with respect to a direction fixed in the space, the step of combining said signals for producing a resultant signal, the said resultant signal representing the bearing of the said ground station with respect to the direction fixed in the space.

9. A navigational method for determining the position of a craft with respect to a fixed point on the ground, comprising the step of producing a current representing the bearing of the fixed point on the ground with respect to the longitudinal axis of the craft, the step of producing a current representing the bearing of the longitudinal axis of the craft with respect to a horizontal plane, and the step of deriving from said two currents an indication of the bearing of the said fixed point.

10. The method of representing directional components of electromagnetic waves arriving at an aircraft, the said components being contained in a vertical plane passing through the longitudinal axis of the aircraft, comprising the step of receiving the said waves and producing a signal representing the component of the direction of arrival of the said waves with respect to the longitudinal axis of the plane the said component being contained in the said vertical plane, producing another signal representing the inclination of the said longitudinal axis and producing from the said signals a resultant signal representing the said directional components.

11. Method of determining in a vertical plane position of an aircraft with reference to two ground stations, the said stations being spaced one from the other, comprising the step of producing a signal representing the projection upon the said plane of the bearing of one of the said stations, the step of producing another signal representing the projection upon the said plane of the bearing of the other station, and the step of producing from the said signals an indication representing the position of the said aircraft with reference to the said two stations as projected upon the said vertical plane.

12. Method of determining in a vertical plane position of a craft with reference to two stations, the said stations being spaced one from the other and transmitting electromagnetic waves at determined and different frequencies, comprising the step of selectively receiving each of said frequencies, producing signals representing respectively projections upon the said plane of the bearings of the said stations, combining the said signals in order to produce an indication of the position of the said craft with reference to the said two stations as projected upon said vertical plane.

13. In a navigational device, means for producing a signal representing a relation between the longitudinal axis of the craft carrying the device and the wave fronts in a radio field, the said relation being projected upon a vertical plane, means for producing another signal representing the relation between the longitudinal axis of the craft and a reference line fixed with respect to the earth, and means responsive to said signals for producing an indication of the relation between the said wave fronts and the said reference line fixed with respect to the earth, the said relation being projected upon the vertical plane.

14. A radio navigational device located in a craft for indicating in a vertical plane the position of the said craft with reference to two radio transmitters located on the ground the said transmitters being spaced one from the other and transmitting waves to the said station, means selectively responsive to the waves received from the said transmitters for producing signals representing the projections upon the said plane of the directions of the said stations, a cathode ray oscillograph comprising a source of an electron stream impinging upon a screen, and means for deflecting the said electron stream by amounts related to the said signals for producing on the said screen an indication of the said station in the said vertical plane.

JACOB NEUFELD.

REFERENCES CITED

The following references are of record in the file of this patent:

UNITED STATES PATENTS

| Number | Name | Date |
|---|---|---|
| 2,116,667 | Chireix | May 10, 1938 |
| 2,170,835 | Simon | Aug. 29, 1939 |
| 2,183,634 | Zworykin | Dec. 19, 1939 |
| 2,190,038 | Neufeld | Feb. 13, 1940 |
| 2,209,191 | Dearing | July 23, 1940 |
| 2,226,366 | Braden | Dec. 24, 1940 |
| 2,226,930 | Hefele | Dec. 31, 1940 |
| 2,232,360 | Barnett | Feb. 18, 1941 |
| 2,253,430 | Hunt et al. | Aug. 19, 1941 |
| 2,225,569 | Peters | Sept. 9, 1941 |
| 2,272,607 | Higonnet | Feb. 10, 1942 |
| 2,321,698 | Nolde | June 15, 1943 |

FOREIGN PATENTS

| Number | Country | Date |
|---|---|---|
| 445,976 | Great Britain | Apr. 22, 1936 |
| 543,638 | Great Britain | Mar. 5, 1942 |

OTHER REFERENCES

Aero Digest, November 1936, pages 34 and 36.